H. M. PARKER.
TILLING MACHINE.
APPLICATION FILED JAN. 18, 1911.
1,010,947.
Patented Dec. 5, 1911.
3 SHEETS—SHEET 1.
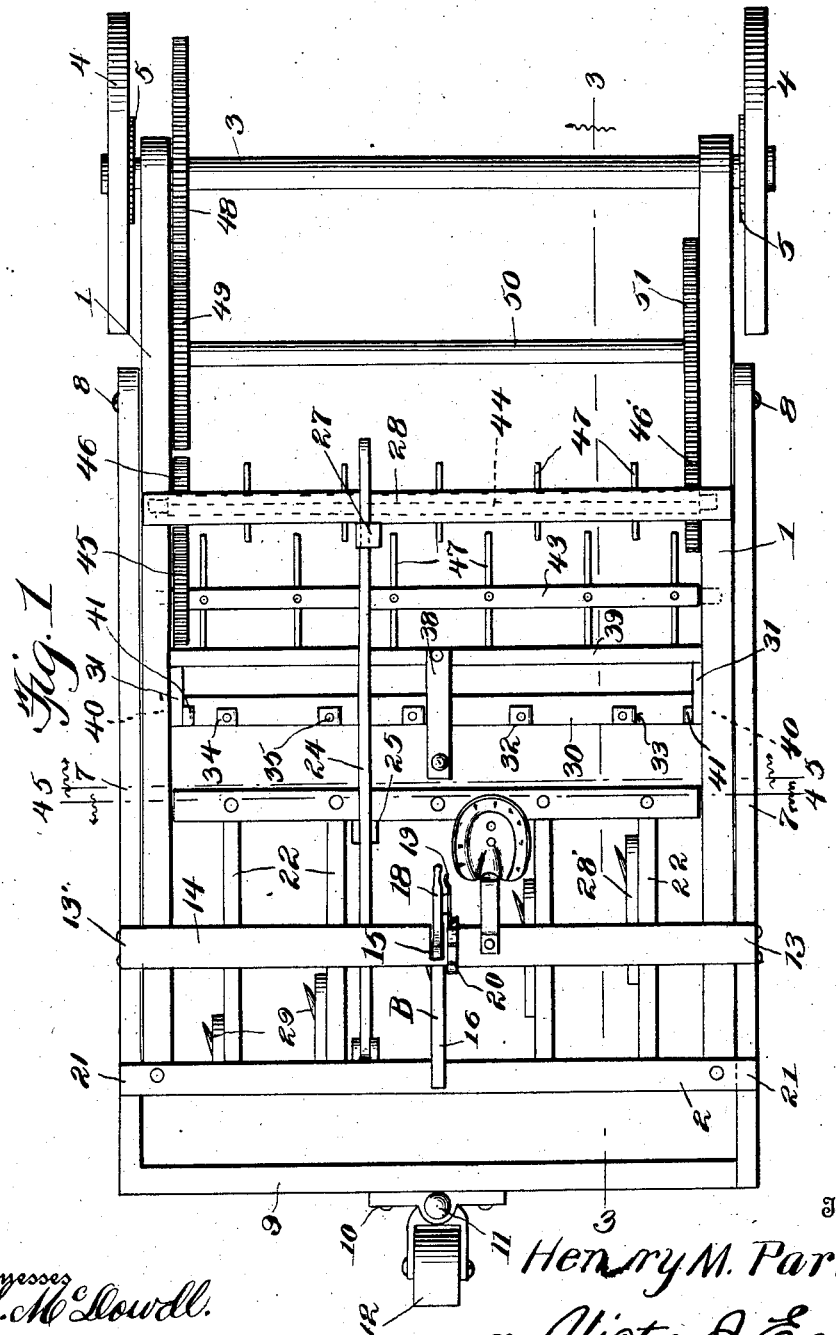

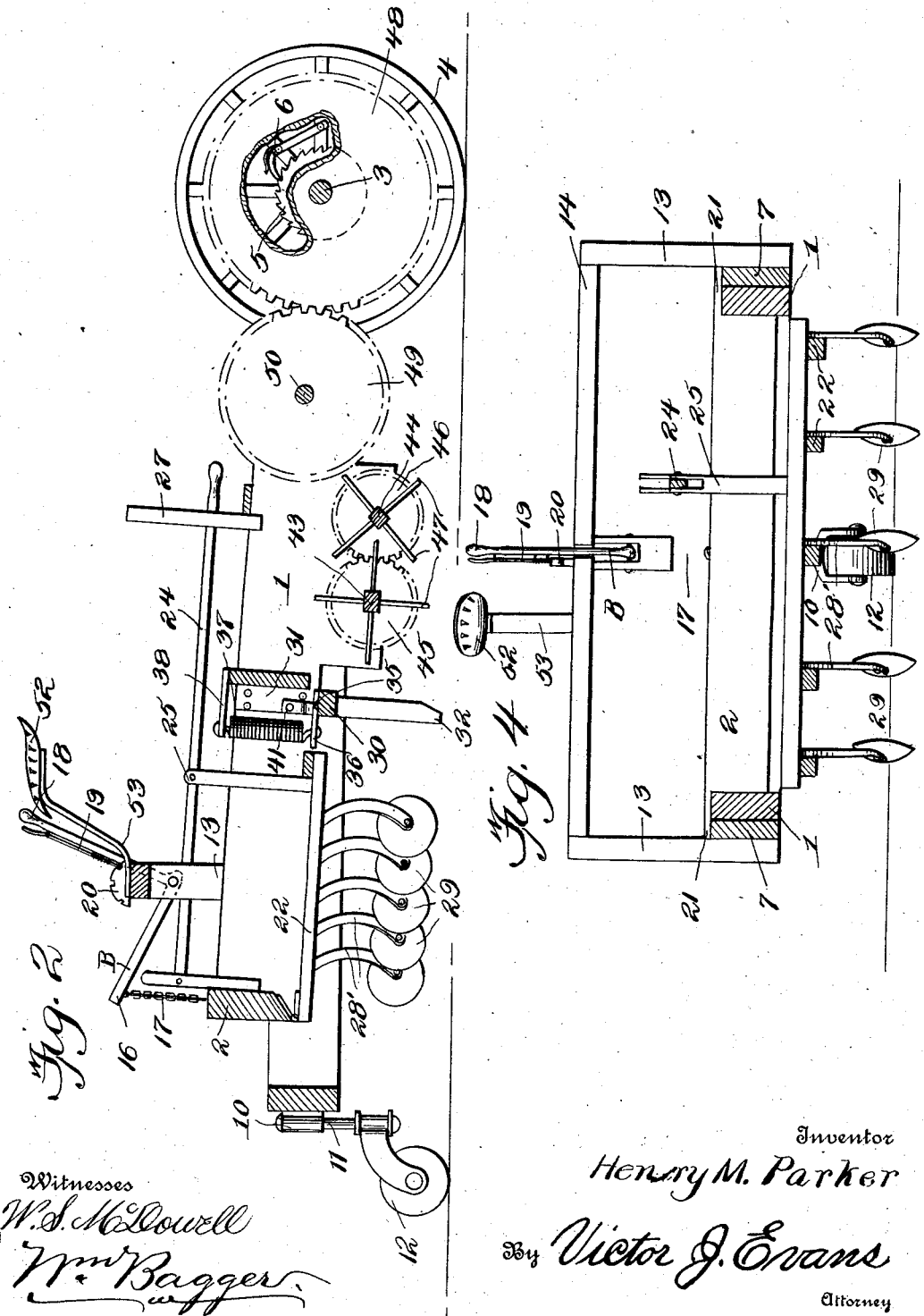

H. M. PARKER.
TILLING MACHINE.
APPLICATION FILED JAN. 18, 1911.
1,010,947.
Patented Dec. 5, 1911.
3 SHEETS—SHEET 3.
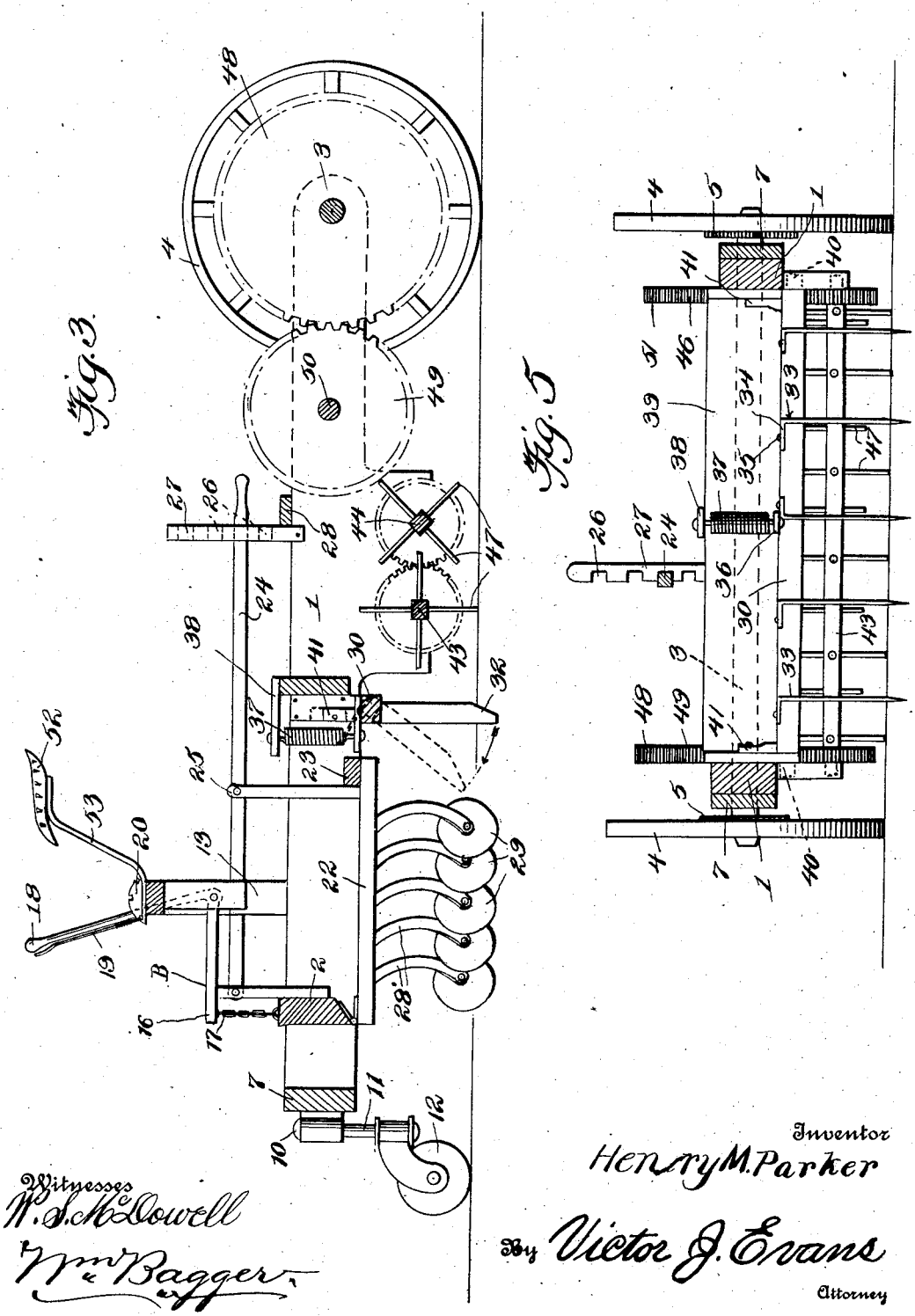
Inventor
Henry M. Parker
By Victor J. Evans
Attorney
Witnesses
W. S. McDowell
Wm. Bagger

UNITED STATES PATENT OFFICE.

HENRY M. PARKER, OF WILLETS, NORTH CAROLINA.

TILLING-MACHINE.

1,010,947.  Specification of Letters Patent.  Patented Dec. 5, 1911.

Application filed January 18, 1911. Serial No. 603,390.

*To all whom it may concern:*

Be it known that I, HENRY M. PARKER, a citizen of the United States of America, residing at Willets, in the county of Jackson and State of North Carolina, have invented new and useful Improvements in Tilling-Machines, of which the following is a specification.

This invention relates to implements for tilling the soil, and it has for its object to produce a simple and efficient machine which by a single operation or passage will break and turn the soil, cut or divide the slices and break up or pulverize the clods, thus leaving the soil in the best possible condition for subsequent planting and cultivation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—Figure 1 is a top plan view of a machine constructed in accordance with the invention. Fig. 2 is a longitudinal sectional view showing the machine arranged for transportation. Fig. 3 is a longitudinal sectional view, showing the machine arranged for operation. Fig. 4 is a transverse sectional view taken on the line 4—4 in Fig. 1. Fig. 5 is a transverse sectional view taken on the line 5—5 in Fig. 1.

Corresponding parts in the several figures are denoted by like characters of reference.

The main carrying frame of the improved machine includes side beams 1, 1 which are connected together at their front ends by a cross bar 2. The said side bars are provided near their rear ends with boxes or bearings wherein the rear axle 3 is supported for rotation, said axle being provided with traction wheels 4, 4 which are mounted loosely upon the ends of the axle. The axle is provided with ratchet wheels 5 that are engaged by spring actuated or resilient pawls 6 which are mounted upon the traction wheels, said pawls and ratchets constituting clutches whereby the traction wheels will rotate the axle when the machine is traveling in a forward direction, while when the machine is moved rearwardly the pawls will slip idly over the ratchets.

A separate front frame is provided which consists of side beams 7, 7 lying adjacent to the outer faces of the side beams 1 of the main carrying frame with which the side beams 7 are pivotally connected by means of bolts 8 a short distance in front of the rear axle 3. The front ends of the side beams 7 are connected together by a cross bar 9 having a bracket 10 wherein the vertical stem or shaft 11 of a caster wheel 12 is journaled, said caster wheel constituting a guide wheel and supporting the wheel for the front end of the machine.

The side beams 7 are provided near their front ends with uprights 13 connected by a cross bar 14 having a slotted bracket 15 wherein a bell crank lever B is fulcrumed, said bell crank having a forwardly extending arm 16 which is connected by a link 17 with the cross bar 2 of the main carrying frame. The upwardly extending arm 18 of the bell crank carries a pawl or dog 19 engaging a ratchet bar 20 which is supported upon and extends forwardly from the cross bar 14. By this simple mechanism the front end of the main carrying frame may be supported at various elevations above the ground. The cross bar 2 at the front end of the main carrying frame is provided at the ends thereof with lugs or extensions 21 overlapping the side beams 7 of the front frame and adapted to rest upon said side beams, thus preventing the front end of the main carrying frame from dropping below a predetermined point. Hingedly connected with the underside of the front beam 2 of the main carrying frame are a plurality of rearwardly extending bars 22, the rear ends of which are connected together by a cross bar 23. A lever 24, which is fulcrumed upon the cross bar 2, is connected by means of a link 25 with the cross bar 23, thus enabling the rear ends of the longitudinal bars 22 to be simultaneously raised or lowered. The lever 24 is adapted to engage any one of a plurality of notches 26 in a rack bar 27 mounted upon and extending upwardly from a cross bar 28 of the main carrying frame, thus enabling the bars 22 to be secured at various adjustments.

Suitably connected with each of the bars 22 is a beam 28' carrying an earth engaging implement, such as a plow 29, which may be of any type desired, such as an ordinary turning plow, a disk or a bull tongue. It is obvious that by manipulating the lever 24, the plows may be set so as to operate at any desired depth in the ground, and that by manipulating the bell crank B the front end of the main carrying frame may be raised or lowered so as to lift the plows out of engagement with the ground or to lower them for operation, as may be desired.

A rocking beam 30, which is supported for oscillation in brackets 31 depending from the side bars of the main carrying frame, is equipped with a plurality of downwardly extending knives or cutters 32, each of said cutters consisting of a blade fitted in a notch 33 in the rocking bar and bent at its upper end to form a laterally extending arm 34 through which a fastening member, such as a screw or bolt 35, extends into the body of the rocking bar, thus securing the knife blade securely in position in an extremely simple and effective manner. The rocking bar is provided with a forwardly extending arm 36 which is connected by a spring 37 with a bracket 38 that extends forwardly from a cross bar 39 of the main carrying frame, the tension of the spring 37 being exerted to move the knives or blades in a forward and upward direction. The rocking bar 30 is provided at the ends thereof with forwardly extending lugs 40, and turn buttons 41 are pivoted upon the brackets 31 which support the rocking bar. These turn buttons may be disposed in the path of the lugs 40, thereby limiting the movement of the blades 32 in a forward direction, and this is the normal operative position of the rocking bar and the blades carried thereby, said blades being disposed in a substantially vertical position so as to cut into the soil, as will be readily understood. If obstructions are encountered, such as stones or the like, the blades are free to yield in a rearward direction. If it is not desired to use the blades, the turn buttons 41 may be moved out of the path of the shoulders upon the rocking bar, and the tension of the springs will then rock the bar so as to move the blades in a forward and upward direction where they will be supported in a non-engaging position with reference to the ground. The side bars of the main carrying frame are provided in rear of the rocking bar 30 with bearings for a pair of shafts 43, 44, the ends of which are provided with intermeshing gears 45, 46. These shafts are also provided with radially extending earth engaging teeth 47 arranged in staggering relation, so that the teeth upon the two shafts will intermesh and operate to thoroughly crush and disintegrate any clods that may be subjected to their action. The rear axle 3 carries a spur wheel 48 meshing with a pinion 49 upon a counter shaft 50, the latter carrying also a spur wheel 51 meshing with one of the gear wheels 46 upon the rear tooth-carrying shaft 44, thus transmitting motion to said shafts from the rear axle when the machine is in operation.

A seat 52 for the driver or operator may be provided, said seat being preferably mounted upon a resilient supporting bar 53 which is suitably connected with the main carrying frame. Draft appliances of any approved character are also to be provided, it being understood in this connection, however, that the machine may, if desired, be propelled by a mechanical motor of any suitable construction.

From the foregoing description, taken in connection with the drawings hereto annexed, the operation and advantages of this invention will be readily understood. It will be seen that the plows will turn the soil in front of the blades 32, the latter being so arranged or disposed as to cut lengthwise through the slices that have been turned by the plows. The soil will next be subjected to the action of the clod breaking devices consisting of revolving toothed shafts which operate in opposite directions, so that the clods will be thoroughly pulverized by the action of the intermeshing or interengaging teeth. The forward end of the main carrying frame may by manipulating the bell crank be lifted sufficiently to support all the operating parts of the machine at a proper elevation above the ground to enable the machine to be conveniently transported from one place to another. Again, by means of the bell crank lever the forward end of the main carrying frame may be lowered until the various implements are supported in the proper position to engage the ground. The plow carrying bars may be independently adjusted by means of the lever 24 to set the plows to operate at the desired depth in the ground.

Having thus described the invention, what is claimed as new, is:—

1. In a machine of the character described, a main carrying frame comprising side members and a front cross bar having overhanging terminal lugs, a wheel carrying axle supporting the rear ends of the side members, a front frame including side members pivotally connected at their rear ends with the side members of the main carrying frame a short distance in front of the rear axle, and a cross bar connecting said side members, a guide wheel connected with the cross bar to support the front end of the front frame, uprights rising from the side members of the front frame, a cross bar connecting said uprights and having a depending slotted bracket and a forwardly extending ratchet bar, a bell crank fulcrumed in the slotted bracket and having an upwardly and a forwardly extending arm, a pawl pivoted upon the upwardly extending arm and engaging the forwardly extending ratchet bar, and a link connecting the forwardly extending arm of the bell crank with the front cross bar of the main carrying frame.

2. In a machine of the character described, a main carrying frame, an axle having traction wheels supporting the rear end of said frame, a front frame having side members pivotally connected with the main carrying frame, rotary supporting means for the front end of the front frame, lever means for adjusting the front end of the main carrying frame with reference to the front frame and for supporting it at the desired elevation, a series of plows connected with the main carrying frame, a plurality of blades supported in rear of the plows and spaced laterally therefrom to engage the slices turned by the plows and to divide said slices longitudinally, revolving tooth carrying shafts arranged in rear of the blades and carrying spur wheels meshed together, and means for transmitting motion to said tooth-carrying shafts from the rear axle of the machine.

In testimony whereof I affix my signature in presence of two witnesses.

HENRY M. PARKER.

Witnesses:
J. R. CRAWFORD,
WADE C. HILL.

---

Copies of this patent may be obtained for five cents each, by addressing the "Commissioner of Patents, Washington, D. C."